United States Patent
Watanabe

(10) Patent No.: US 6,688,655 B1
(45) Date of Patent: Feb. 10, 2004

(54) QUICK CONNECTION-RELEASE COUPLING

(75) Inventor: Koichi Watanabe, Hiratsuka (JP)

(73) Assignee: Yokohama Hydex Co., Ltd., Tokyo (JP)

( * ) Notice: Subject to any disclaimer, the term of this patent is extended or adjusted under 35 U.S.C. 154(b) by 0 days.

(21) Appl. No.: 10/244,530

(22) Filed: Sep. 17, 2002

(51) Int. Cl.$^7$ ................................................. F16L 37/18
(52) U.S. Cl. ........................ 285/321; 285/39; 285/308
(58) Field of Search .................. 285/307, 39, 305, 285/321, 319, 308

(56) References Cited

U.S. PATENT DOCUMENTS

| | | | | |
|---|---|---|---|---|
| 4,906,031 A | * | 3/1990 | Vyse | 285/305 |
| 5,570,910 A | * | 11/1996 | Highlen | 285/321 |
| 6,517,121 B1 | * | 2/2003 | Cresswell | 285/308 |
| 6,592,151 B2 | * | 7/2003 | Densel et al. | 285/39 |
| 2002/0113431 A1 | * | 8/2002 | LeMay et al. | 285/39 |
| 2002/0185864 A1 | * | 12/2002 | LeMay et al. | 285/321 |

* cited by examiner

*Primary Examiner*—Lynne H. Browne
*Assistant Examiner*—Aaron Dunwoody
(74) *Attorney, Agent, or Firm*—Rader, Fishman & Grauer PLLC

(57) ABSTRACT

A quick connection-release coupling according to the present invention comprises a female coupling part having a cylindrical adapter and a male coupling part having a cylindrical nipple, a resiliently expandable and retractable C-shaped spring ring being arranged along an inner circumferential surface of the adapter, the nipple having an engaging portion protruded on an outer circumferential surface thereof, and the engaging portion being capable of being engaged with or disengaged from said C-shaped spring ring. A cylindrical releasing jig being movable forward and backward against the engaging portion is threadably arranged on the outer circumferential surface of the nipple. When pulling the nipple out of the adapter, the releasing jig is moved forward and pushes the C-shaped spring ring using an advancing force of the thread, thereby radially expanding the C-shaped spring ring to cause the engaged state between the engaging portion and C-shaped spring ring to be released.

10 Claims, 7 Drawing Sheets

QUICK CONNECTION-RELEASE COUPLING

BACKGROUND OF THE INVENTION

This invention relates to a quick connection-release coupling used as a coupling for connecting a fluid transferring hose or the like and, more particularly, to a quick connection-release coupling capable of being used in a pressure range from low pressure to high pressure.

In the prior art, there is known union joints used as couplings for connecting a fluid transferring hose. In general, the union joint employs a ball-locking system for connecting a female coupling part with a male coupling part. Since the ball used produces a point contact in regard to the female coupling part and the male coupling part, a special processing such as a heat treatment and the like is applied to increase the strength of the ball. Due to this fact, there is a problem that the union joint is expensive. Additionally, since a tool such as a wrench must be used to connect and release the joint, its connection and release operation is troublesome. As a result, there is another problem that it takes much time to perform maintenance work.

On the other hand, there are well known quick connection-release couplings used as couplings for connecting a fluid transferring hose, employing a C-shaped spring ring system shown in FIG. 12. The coupling includes a female coupling part having a cylindrical adapter 21 and a cap 22 attached thereto, a slit 23 being formed in the inner surface of the cap 22, and a C-shaped spring ring 24 which is resiliently expandable and retractable being located in the slit 23. The male coupling part of the quick connection-release coupling which is inserted into the female coupling part has a cylindrical nipple 25, an annular engagement portion 26 for engaging with the C-shaped spring ring 24 being protruding on the outer circumferential surface of the cylindrical nipple 25 and extending along the circumferential direction. A releasing jig 28 having a dust-proof cap 27 fixed thereto is slidably attached to the outer circumferential surface of the nipple 25. Reference numeral 29 denotes an O-ring for sealing, and reference numeral 30 denotes a socket fixed to the nipple 25.

When attaching the nipple 25 to the adapter 21, the nipple 25 is inserted into the adapter 21 and the C-shaped spring ring 24 is engaged with the engaging portion 26, whereby the nipple 25 is locked in the adapter 21 (the state shown in FIG. 12). When releasing the nipple 25 from the adapter 21, the releasing jig 28 is moved forward in the arrow direction and the front end portion of the releasing jig 28 inserted through a clearance between the cap 22 and the nipple 25 is pushed against the C-shaped spring ring 24. The further pushing movement of the releasing jig 28 forces the C-shaped spring ring 24 pushed by the releasing jig 28 radially expand gradually and ride over the top of the engaging portion 26, thereby releasing the engaged state between the C-shaped spring ring 24 and the engaging portion 26.

A quick connection-release coupling of the type described above has an advantage that its connection-release operation can be easily performed and a maintenance work time can be shortened because an operator can manually connect and release it without using any tool. The C-shaped spring ring 24 is line contacted with the adapter 21 and the nipple 25, resulting in that it can be used without performing any special processing such as heat treatment, etc. In addition, since the quick connection-release coupling can have less component parts than the union joint, if compared, it is possible to attain a low cost.

However, since the connection-release work is carried out manually, it is not possible to use either a C-shaped spring ring having a wire diameter exceeding 1.0 mm or a C-shaped spring ring made of high-strength material having a high elastic modulus of 180,000N/mm$^2$ such as stainless steel material, which particularly makes the releasing operation difficult. Accordingly, although the aforesaid quick connection-release coupling has the superior advantages as described above, it has a problem that it is exclusively used for low-pressure fluid and it cannot be used for high-pressure fluid.

SUMMARY OF THE INVENTION

It is an object of the present invention to provide a quick connection-release coupling capable of being used in a range from low pressure to high pressure without reducing the superior advantages of the aforesaid quick connection-release coupling.

To achieve the above object, the present invention provides a quick connection-release coupling comprising a female coupling part having a cylindrical adapter, along an inner circumferential surface of which a resiliently expandable and retractable C-shaped spring ring is arranged, and a male coupling part having a cylindrical nipple with an engaging portion protruded on an outer circumferential surface thereof, the engaging portion being capable of being engaged with and disengaged from the C-shaped spring ring, the nipple being connectable to the adapter when pushed into the adapter so as to engage the C-shaped spring ring with the engaging portion, and being detachable from the adapter when the engaged state between the engaging portion and C-shaped spring ring is released by expanding the C-shaped spring by pushing the C-shaped spring, characterized in that a cylindrical releasing jig being movable forward and backward against the engaging portion is threadably arranged on the outer circumferential surface of the nipple, and the engaged state between the engaging portion and C-shaped spring ring can be released when the C-shaped spring ring is expanded by moving the releasing jig forward and by pushing the C-shaped spring ring in the separating operation of the nipple from the adapter.

In accordance with the quick connection-release coupling of the present invention, even if a spring material having a high elastic modulus and a high strength or a thick wire material greater than 1.0 mm in wire diameter, used for high pressure fluid, is employed, a manually turning operation of the releasing jig by an operator enables the engaged state between the engaging portion and the C-shaped spring ring to be easily released because of releasing it using an advancing force by screwing of the releasing jig, thereby allowing the nipple to be detached from the adapter. Accordingly, one coupling can be used in a wide pressure range from low pressure to high pressure.

Since the releasing jig is constructed such that it is threadably fitted, the superior advantages such as a reduction in maintenance operation time and low cost found in the prior art quick connection-release coupling are not deteriorated.

DETAILED DESCRIPTION OF THE PREFERRED EMBODIMENT

A quick connection-release coupling Q according to the present invention will be described below in detail with reference to the drawings.

Figure 1:
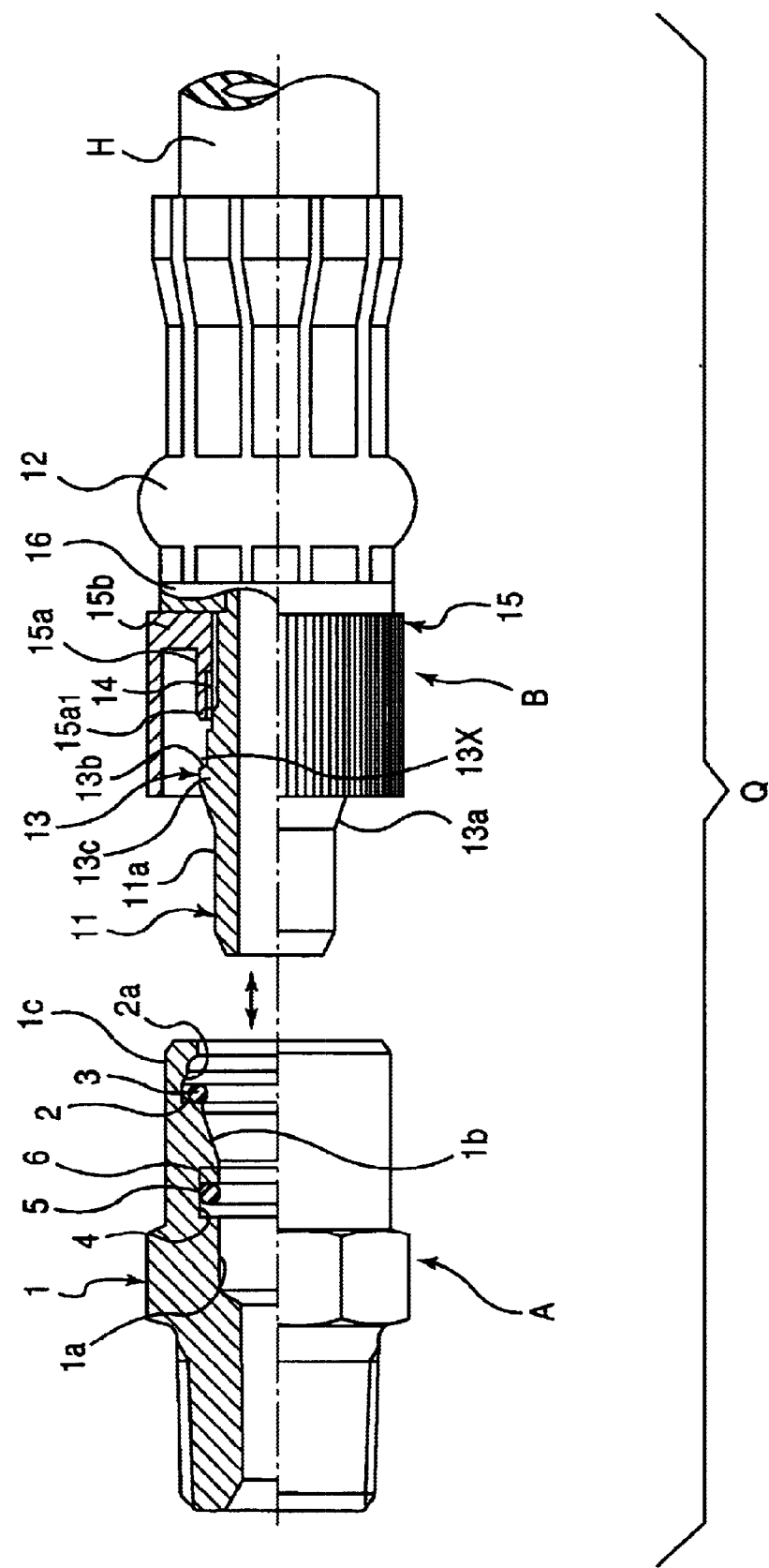
FIG. 1 is a front elevational view, partially cross-sectioned, showing one example of the quick connection-release coupling of the present invention in a separated state.

As shown in FIG. 1, the quick connection-release coupling Q of the present invention comprises a female coupling part A and a male coupling part B. The female coupling part A has a cylindrical formed adapter 1. A first annular groove 2 extending along a circumferential direction of the adapter 1 is formed on an inner circumferential surface 1a of the adapter 1 on one end side (connecting side) thereof, and a C-shaped spring ring 3 which is resiliently expandable and retractable is arranged within the first groove 2 in such a way that it is partially protruded out of the first groove 2. The first groove 2 has a groove width such that the C-shaped spring ring 3 can be moved in the groove width direction, and a groove wall surface 2a on one end side of the first groove 2 is an inclined surface for locking the C-shaped spring ring 3.

Formed on the inner circumferential surface 1a is a second annular groove 4 which is inner than the first groove 2 and is extending along the circumferential direction, and an O-ring 5 for sealing and a back-up ring 6 are located in the second groove 4. The portion of the inner circumferential surface 1a between the first groove 2 and the second groove 4 is an inclined surface 1b the first groove 2 side of which has an increased diameter.

The male coupling part B has a cylindrical formed nipple 11. A cylindrical socket 12 is press-fitted onto the nipple 11. Reference symbol H denotes a fluid transferring hose fixed between the nipple 11 and the socket 12.

An engaging portion 13 which can be engaged to and disengaged from the C-shaped spring ring 3 is protruded on an outer circumferential surface 11a of the nipple 11. The engaging portion 13 is formed in an annular shape on the outer circumferential surface 11a of the nipple 11 along the circumferential direction of the nipple 11, its front side is formed as an inclined surface 13a and its rear side is formed as an engaging portion 13X having an inclined surface 13b for locking the C-shaped spring ring 3.

Formed on a portion of the outer circumferential surface 11a of the nipple 11 positioned on the nearer nipple counter-connecting side (socket 12 side) than the engaging portion 13 is a threaded portion 14, to which a cylindrical releasing jig 15 for detaching the nipple 11 is threadably fitted in such a manner that it can move forward and backward against the engaging portion 13.

The releasing jig 15 includes a cylindrical jig body 15a threadably fitted onto the outer circumferential surface 11a of the nipple 11, and a dust-proof cap 15b integrally formed with the jig body 15a on the outer circumferential side thereof. The jig body 15a is constructed such that a front end portion $15a_1$ thereof can move into or out of the adapter 1 through a clearance S (refer to FIG. 2) between the nipple 11 and the adapter 1 when the releasing jig 15 is moved. The dust-proof cap 15b, when the nipple 11 is attached to the adapter 1, contacts an outer circumferential surface 1c of the adapter 1 so as to prevent dust from entering into a space between the nipple 11 and the adapter 1. Reference numeral 16 denotes an annular collar fixed to the nipple 11.

Figure 2:
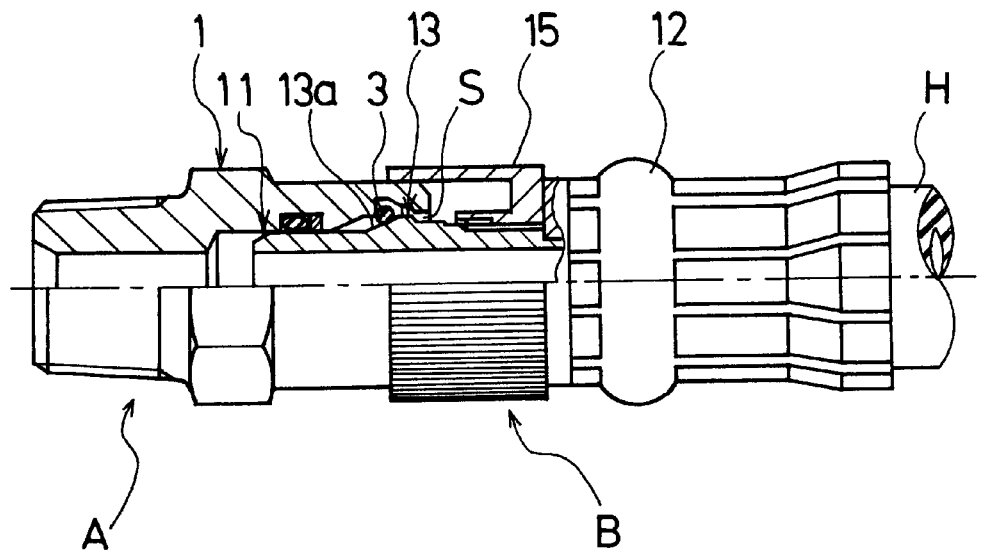
FIG. 2 is a front elevational view, partially cross-sectioned, showing a state in which the nipple is inserted into the adapter in the connecting process of the quick connection-release coupling of FIG. 1.
Figure 3:
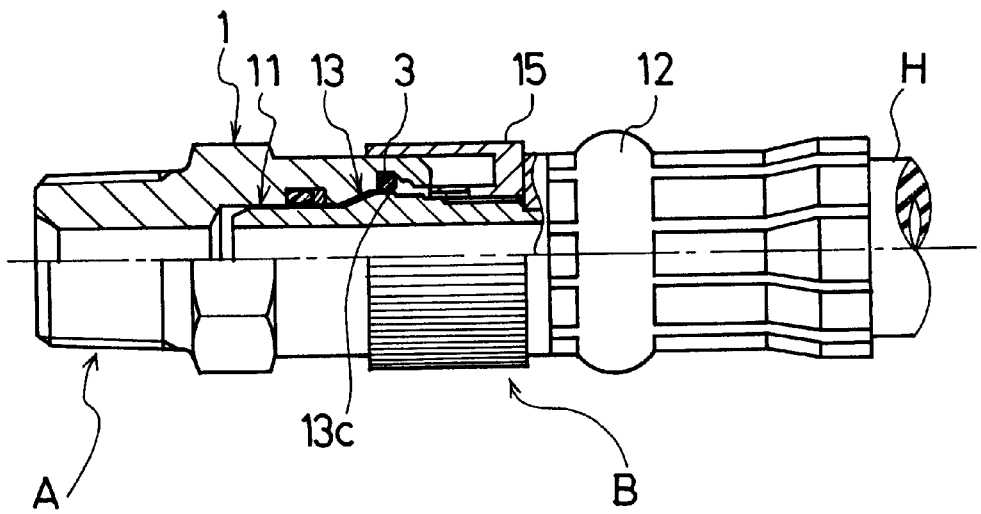
FIG. 3 is a front elevational view, partially cross-sectioned, showing a state subsequent to the state shown in FIG. 2 in the connecting process of the quick connection-release coupling of FIG. 1.

The aforesaid quick connection-release coupling is connected as shown in FIGS. 2 to 7. At first, the nipple 11 is inserted into the adapter 1. As shown in FIG. 2, the C-shaped spring ring 3 is contacted with the inclined surface 13a of the engaging portion 13 of the nipple 11 which has inserted.

Figure 4:
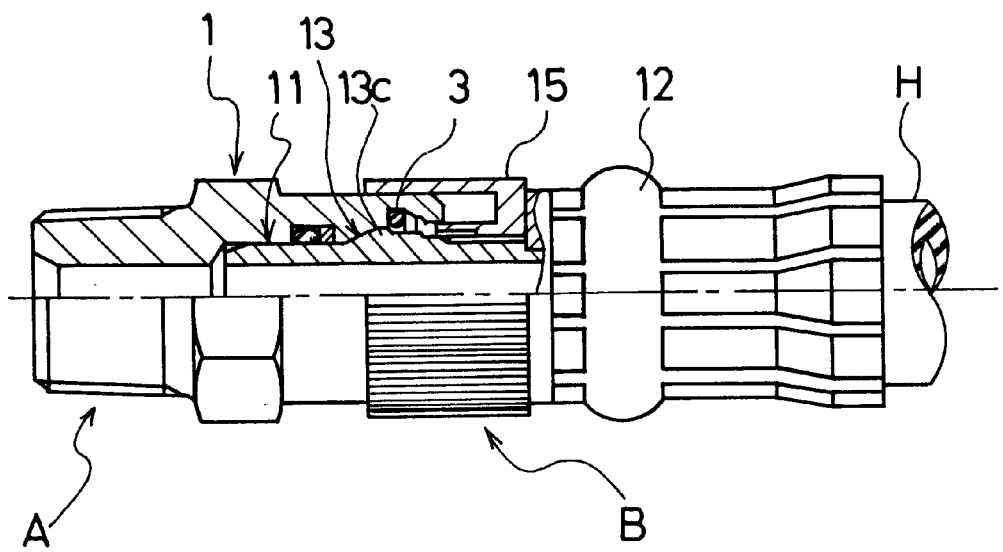
FIG. 4 is a front elevational view, partially cross-sectioned, showing a state subsequent to the state shown in FIG. 3 in the connecting process of the quick connection-release coupling of FIG. 1.
Figure 5:
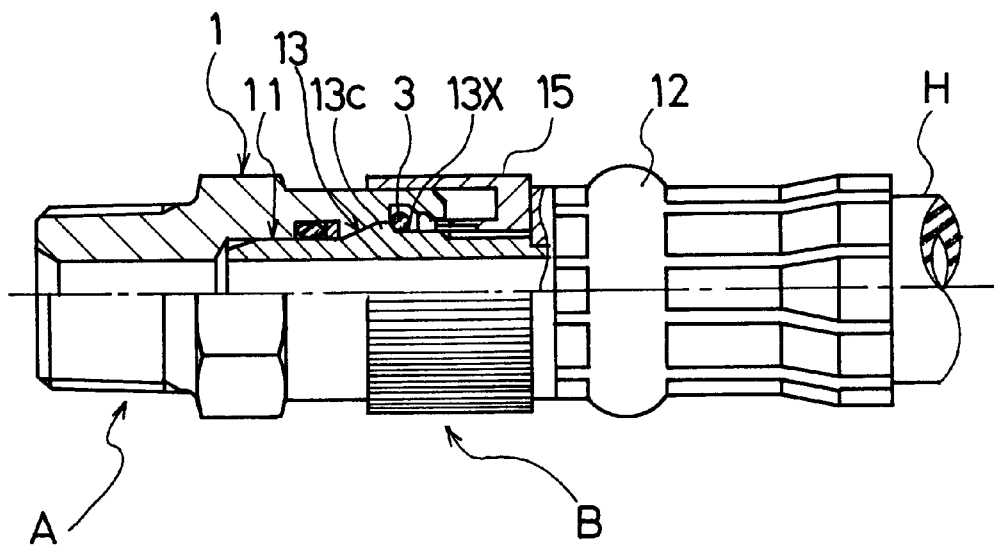
FIG. 5 is a front elevational view, partially cross-sectioned, showing a state subsequent to the state shown in FIG. 4 in the connecting process of the quick connection-release coupling of FIG. 1.

In this state, the nipple 11 is pushed into the adapter 1. This causes the C-shaped spring ring 3 to be gradually expanded radially along the inclined surface 13a of the engaging portion 13 on the move and the C-shaped spring ring 3 then reaches a top portion 13c of the engaging portion 13. Further, the C-shaped spring ring 3 rides over the top portion 13c as shown in FIG. 4 and is engaged with the engaging portion 13X as shown in FIG. 5.

Figure 6:
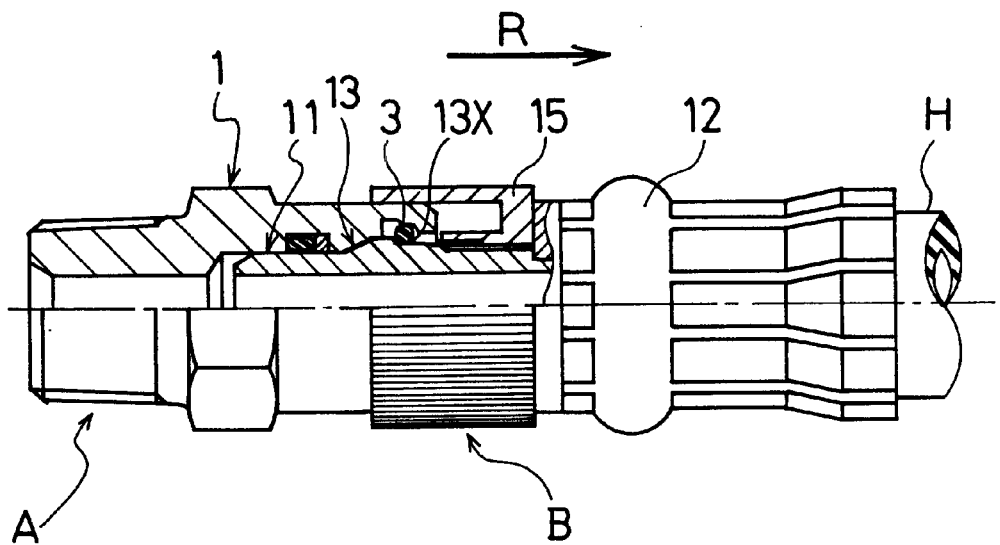
FIG. 6 is a front elevational view, partially cross-sectioned, showing a state subsequent to the state shown in FIG. 5 in the connecting process of the quick connection-release coupling of FIG. 1.
Figure 7:
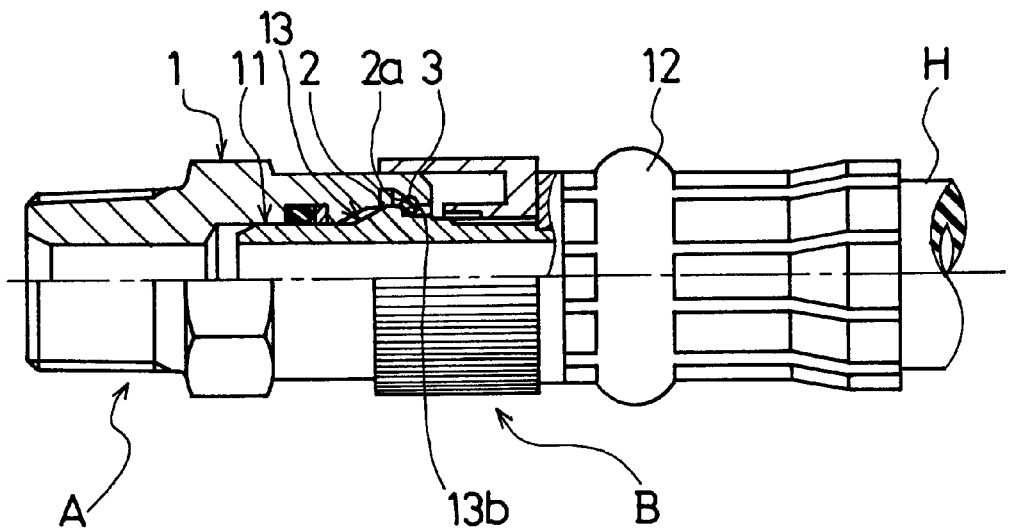
FIG. 7 is a front elevational view, partially cross-sectioned, showing a state in which the quick connection-release coupling of FIG. 1 is completely connected.

In this state, the nipple 11 is moved by pulling in the counter-inserting direction as indicated by an arrow R in FIG. 6, thereby locking the C-shaped spring ring 3 to the engaging portion 13X in such a state that it is held between the inclined surface 13b of the engaging portion 13 and the inclined groove wall surface 2a of the first groove 2, as shown in FIG. 7.

Figure 8:
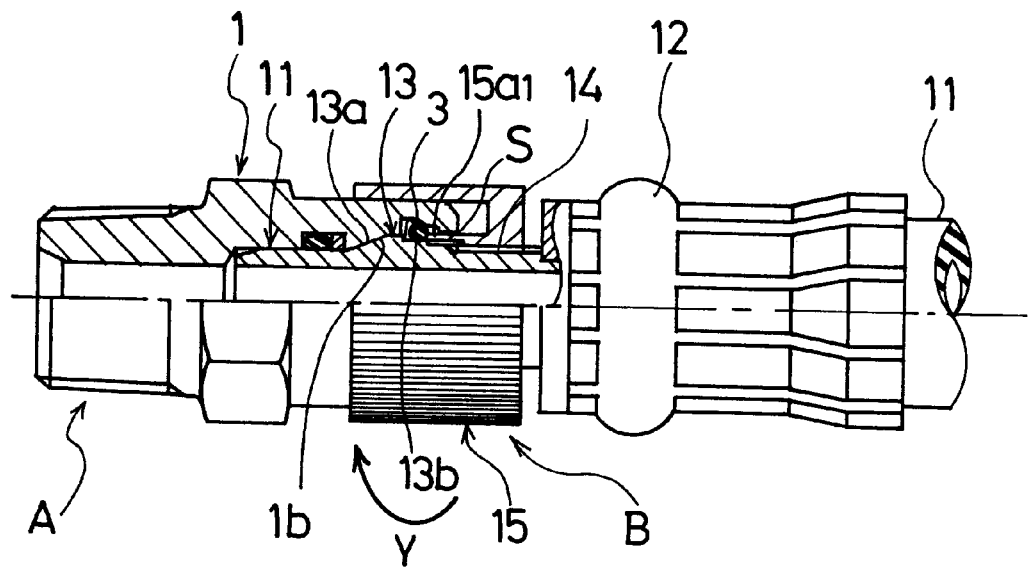
FIG. 8 is a front elevational view, partially cross-sectioned, showing a state in which the nipple is pushed into the adapter in the separating process of the quick connection-release coupling of FIG. 1.

The nipple 11 is separated from the adapter 1 in the following procedure. At first, as shown in FIG. 8, the nipple 11 is pushed into the adapter 1 until the inclined surface 13a contacts with the inclined surface 1b. Then, the releasing jig 15 is turned clockwise as indicated by an arrow Y. This makes the releasing jig 15 move forward, whereby the front end portion $15a_1$ of the jig body 15a advances into the adapter 1 through the clearance S and strikes against the C-shaped spring ring 3, thereby pushing the C-shaped spring ring 3 in a leftward direction shown in the figure.

Figure 9:
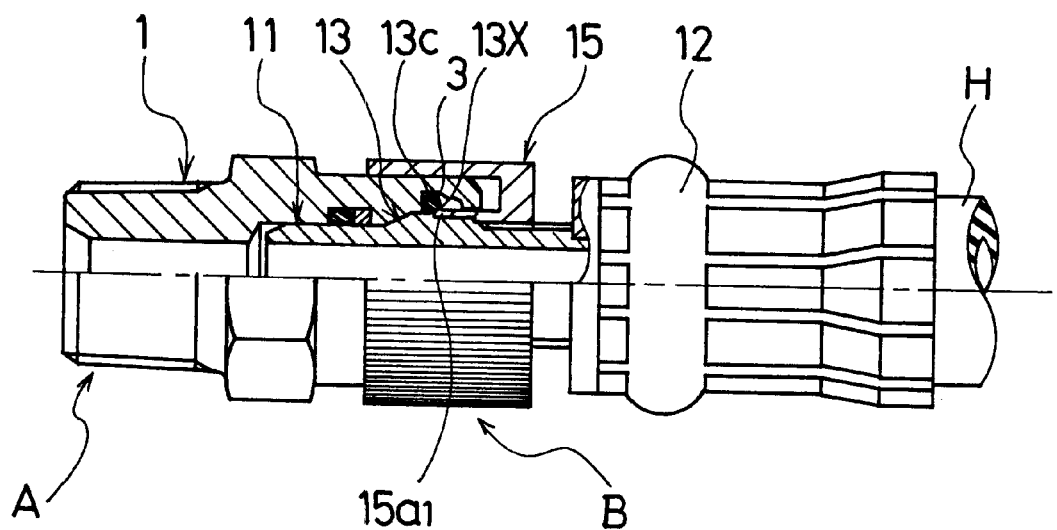
FIG. 9 is a front elevational view, partially cross-sectioned, showing a state subsequent to the state shown in FIG. 8 in the separating process of the quick connection-release coupling of FIG. 1.
Figure 10:
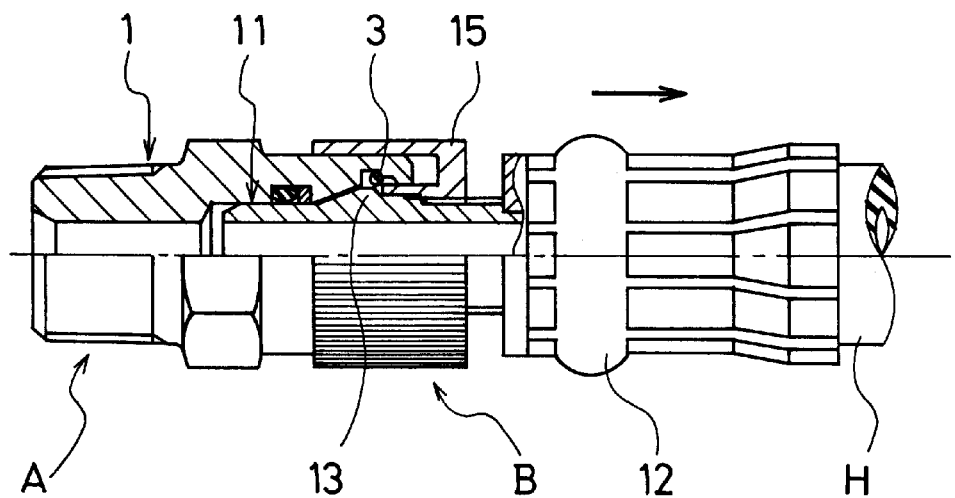
FIG. 10 is a front elevational view, partially cross-sectioned, showing a state subsequent to the state shown in FIG. 9 in the separating process of the quick connection-release coupling of FIG. 1.
Figure 11:
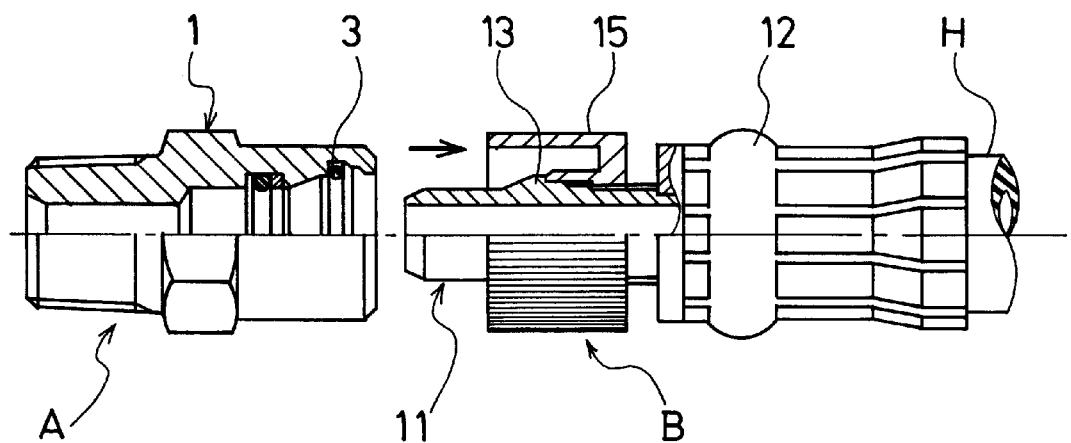
FIG. 11 is a front elevational view, partially cross-sectioned, showing a state in which the quick connection-release coupling of FIG. 1 is completely separated.
Figure 12:
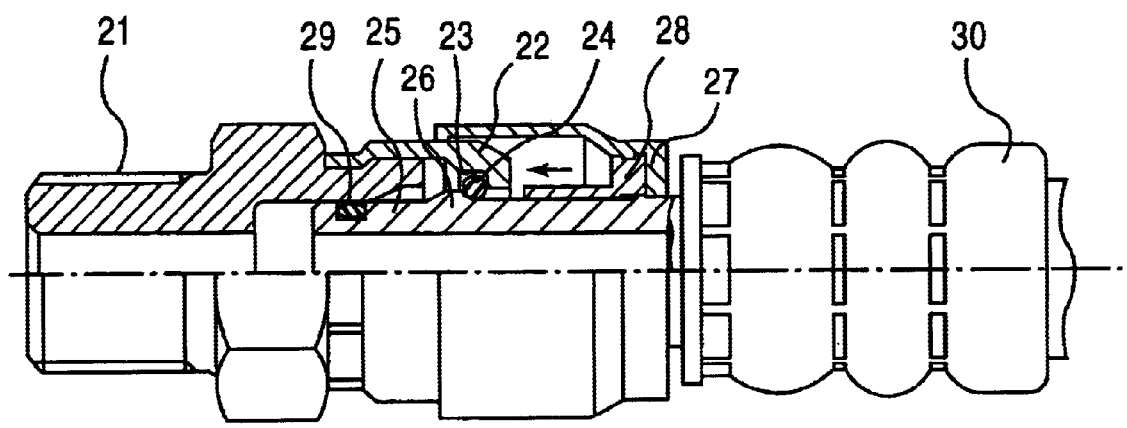
FIG. 12 is a front elevational view, partially cross-sectioned, showing a conventional quick connection-release coupling in a connected state.

The C-shaped spring ring 3 ascends along the inclined surface 13b of the engaging portion 13 while being expanded, and is then pushed up onto the top portion 13c of the engaging portion 13 as shown in FIG. 9. Thus the engaged state between the engaging portion 13X and the C-shaped spring ring 3 is released, and the nipple is put in such a state that it can be pulled out of the adapter 1. In this state, the operator manually pulls the male coupling part B as indicated by the arrow shown in FIG. 10. As a result, the nipple 11 is detached from the adapter 1 as shown in FIG. 11, and the female coupling part A and the male coupling part B are separated from each other.

In accordance with the present invention described above, the releasing jig 15 is threadably arranged on the outer circumferential surface 11a of the nipple 11 in such a way that it can move toward and retract from the engaging portion 13, and the engaged state between the engaging portion 13 and the C-shaped spring ring 3 is released using an advancing force by threading of the releasing jig 15, resulting in that an operator can easily separate the nipple 11 by hand even if a spring material which has a high elastic modulus and a high strength, and is not easy to expand, such as stainless steel, or a thick wire material with a diameter of 1.0 mm or more is used. Accordingly, the same quick connection-release coupling can be adapted in a range from low pressure to high pressure.

Since the releasing jig 15 is threadably assembled in such a way that it can advance and retract, the superior advantages of reduced maintenance work time and low cost provided by the prior art quick connection-release coupling are not reduced.

In the present invention, the aforesaid C-shaped spring ring 3 is preferably formed from a spring material made of phosphor bronze having a high spring characteristic and a high strength. The phosphor bronze spring material has about half an elastic modulus (98,000 N/mm$^2$) as compared with that of stainless steel in general use but has a high strength, so an inserting characteristic of the nipple 11 into the adapter 1 is good and it can attain a high pressure-resistance characteristic. Therefore, both a good inserting characteristic and a high pressure-resistance characteristic can be realized. An operator can detach the coupling manually because of the good inserting characteristic even if the inclined surface 13a of the engaging portion 13 is set to a higher angle in respect to the coupling axial direction than the prior art coupling, thereby allowing a length of the inclined surface 13a in the axial direction to be shortened. As a result, the length of the quick connection-release coupling can be reduced to make the coupling compact.

Although the quick connection-release coupling of the present invention can be preferably used in particular as a coupling for connecting a fluid transferring hose, the present invention is not limited thereto, and the quick connection-release coupling of the present invention can also be effectively used, for example, as a coupling for separably connecting pipes.

What is claimed is:

1. A quick connection-release coupling comprising:
    a female coupling part having a cylindrical adapter, a resiliently expandable and retractable C-shaped spring ring being arranged along an inner circumferential surface of the adapter; and
    a male coupling part having a cylindrical nipple with an engaging portion protruded on an outer circumferential surface thereof, the engaging portion being capable of being engaged with or disengaged from said C-shaped spring ring,
    said nipple being connectable to said adapter when pushed into said adapter so as to engage said C-shaped spring ring with said engaging portion, and being separable from the adapter when releasing an engaged state between said engaging portion and said C-shaped spring ring by expanding said C-shaped spring,
    wherein a cylindrical releasing jig capable of being movable forward and backward against said engaging portion is threadably arranged on the outer circumferential surface of said nipple, and the engaged state between said engaging portion and said C-shaped spring ring can be released when said C-shaped spring ring is expanded by moving said releasing jig forward and by pushing said C-shaped spring ring in the separating operation of said nipple from said adapter.

2. A quick connection-release coupling according to claim 1, wherein said engaging portion is annularly protruded on the outer circumferential surface of said nipple along a circumferential direction thereof.

3. A quick connection-release coupling according to claim 1, wherein said engaging portion has an engaging section for locking said C-shaped spring ring at a rear side thereof.

4. A quick connection-release coupling according to claim 3, wherein said engaging portion has an inclined surface for locking said C-shaped spring ring.

5. A quick connection-release coupling according to claim 1, wherein said releasing jig is threadably arranged on the outer circumferential surface of said nipple positioned at the nearer nipple counter-connecting side than said engaging portion.

6. A quick connection-release coupling according to claim 1, wherein a first annular groove is formed on the inner circumferential surface of said adapter on the nipple connecting side along a circumferential direction thereof, and said C-shaped spring ring is arranged in said first groove so as to partially project out of the first groove.

7. A quick connection-release coupling according to claim 6, wherein said first groove has a groove width such that said C-shaped spring ring can move in an axial direction of said adapter, and a nipple connecting side wall surface of said first groove is formed into an inclined surface, and said C-shaped spring ring can be locked between said inclined surface and said engaging portion.

8. A quick connection-release coupling according to claim 1, wherein a second annular groove is formed on the inner circumferential surface of said adapter along the circumferential direction thereof and positioned inner than said C-shaped spring ring, and an O-ring for sealing which can contact the outer circumferential surface of said nipple is located in said second groove.

9. A quick connection-release coupling according to claim 1, wherein said releasing jig comprises a cylindrical jig body threadably engaged with the outer circumferential surface of said nipple and a dust-proof cap formed integrally with said jig body on the outer circumferential side thereof.

10. A quick connection-release coupling according to claim 1, wherein said C-shaped spring ring is formed from phosphor bronze spring material.

* * * * *